US012561690B2

(12) United States Patent
Swaminathan et al.

(10) Patent No.: US 12,561,690 B2
(45) Date of Patent: Feb. 24, 2026

(54) CONTACTLESS ACCESS TO SERVICE DEVICES TO FACILITATE SECURE TRANSACTIONS

(71) Applicant: Truist Bank, Charlotte, NC (US)

(72) Inventors: Sudhakar Swaminathan, Duluth, GA (US); Muthu Gopalakrishnan, Suwanee, GA (US); Ryan Loesch, Cumming, GA (US)

(73) Assignee: Truist Bank, Charlotte, NC (US)

( * ) Notice: Subject to any disclaimer, the term of this patent is extended or adjusted under 35 U.S.C. 154(b) by 195 days.

(21) Appl. No.: 18/221,145

(22) Filed: Jul. 12, 2023

(65) Prior Publication Data

US 2025/0021986 A1     Jan. 16, 2025

(51) Int. Cl.
*G06Q 20/40* (2012.01)
*G06Q 20/32* (2012.01)

(52) U.S. Cl.
CPC ....... *G06Q 20/409* (2013.01); *G06Q 20/3276* (2013.01); *G06Q 20/4015* (2020.05); *G06Q 2220/00* (2013.01)

(58) Field of Classification Search
None
See application file for complete search history.

(56) References Cited

U.S. PATENT DOCUMENTS

| | | | | | |
|---|---|---|---|---|---|
| 8,201,224 | B1 * | 6/2012 | Spertus | .............. | G06F 21/6218 |
| | | | | | 713/153 |
| 9,589,402 | B2 * | 3/2017 | Raina | ................. | G07C 9/00309 |

| | | | | | |
|---|---|---|---|---|---|
| 10,902,705 | B1 * | 1/2021 | Rose | .................. | G06Q 20/4014 |
| 11,188,889 | B2 * | 11/2021 | Nuzzi | ................ | G06Q 20/3224 |
| 11,715,109 | B2 * | 8/2023 | Pi Farias | ............. | G06Q 20/203 |
| | | | | | 705/16 |
| 2008/0306850 | A1 * | 12/2008 | Horvath | ............ | G06Q 20/3829 |
| | | | | | 705/35 |

(Continued)

OTHER PUBLICATIONS

Solano, Antonio et al. "One-Time URL: A Proximity Security Mechanism between Internet of Things and Mobile Devices." Sensors (Basel, Switzerland) vol. 16,10 1694, 2016, Oct. 13, 2016, doi:10.3390/s16101694 (Year: 2016).*

(Continued)

*Primary Examiner* — Eduardo Castilho
(74) *Attorney, Agent, or Firm* — Kilpatrick Townsend & Stockton LLP; Michael A. Springs, Esq.

(57) ABSTRACT

A system can be provided that can enable contactless access to service devices to facilitate secure transactions. For example, the system can include Internet of Things (IoT) service devices associated with a service provider. The system can also include a computing environment, which may receive an access request from a mobile device. The access request can be transmitted in response to a user of the mobile device performing a contactless authentication process with an IoT service device. The computing environment can then identify the IoT service device and can identify a user account associated with the mobile device and with the service provider. The computing environment can further provide access for the mobile device to functions of the IoT service device via a software application associated with the service provider. The functions can be used to facilitate secure transactions between the IoT service device and the user account.

15 Claims, 4 Drawing Sheets

(56) References Cited

U.S. PATENT DOCUMENTS

| | | | | |
|---|---|---|---|---|
| 2011/0238517 | A1* | 9/2011 | Ramalingam | G06Q 20/229 |
| | | | | 705/16 |
| 2012/0209768 | A1* | 8/2012 | Nuzzi | G06Q 40/02 |
| | | | | 705/44 |
| 2013/0055356 | A1* | 2/2013 | Gafni | G06F 21/40 |
| | | | | 726/4 |
| 2013/0185206 | A1* | 7/2013 | Leggett | G06Q 20/32 |
| | | | | 705/44 |
| 2014/0164243 | A1* | 6/2014 | Aabye | G06Q 20/20 |
| | | | | 705/44 |
| 2014/0214664 | A1* | 7/2014 | Kim | G06Q 20/4014 |
| | | | | 705/41 |
| 2014/0375422 | A1* | 12/2014 | Huber | G07C 9/00571 |
| | | | | 340/5.61 |
| 2015/0363581 | A1* | 12/2015 | Ranadive | G06F 21/34 |
| | | | | 726/19 |
| 2016/0086176 | A1* | 3/2016 | Silva Pinto | G06Q 20/385 |
| | | | | 705/44 |
| 2017/0026488 | A1* | 1/2017 | Hao | H04L 67/60 |
| 2018/0041487 | A1* | 2/2018 | Wang | G06F 16/9535 |
| 2018/0316668 | A1* | 11/2018 | Yasarapu | G06Q 20/385 |
| 2019/0332340 | A1* | 10/2019 | Somaiah | G06Q 20/045 |
| 2019/0372900 | A1* | 12/2019 | Chen | H04L 67/02 |
| 2020/0311671 | A1* | 10/2020 | Lundahl | G06Q 20/326 |
| 2021/0127436 | A1* | 4/2021 | Smets | G06Q 20/325 |
| 2021/0158316 | A1* | 5/2021 | Ravinathan | G06Q 20/385 |
| 2021/0166234 | A1* | 6/2021 | Anderson | G06Q 20/10 |
| 2022/0044506 | A1* | 2/2022 | Dewey | G07C 9/215 |
| 2023/0043702 | A1* | 2/2023 | Sells | G06Q 20/381 |
| 2023/0115569 | A1* | 4/2023 | Kehrein | G06Q 20/3276 |
| | | | | 726/4 |
| 2023/0237864 | A1* | 7/2023 | Lanzi | G06Q 10/08 |
| | | | | 705/339 |
| 2024/0029052 | A1* | 1/2024 | Pinnamaneni | G06Q 20/352 |

OTHER PUBLICATIONS

M. Ennafiri, M. E. Hassan Charaf and A. A. Madi, ""Towards Secure Transactions with IoT: An Advanced Smart Payment Solution,"" 2023 3rd Iraset, Mohammedia, Morocco, 2023, pp. 01-06, doi: 10.1109/IRASET571 (Year: 2023).*

K.-H. Yeh, "A Secure Transaction Scheme With Certificateless Cryptographic Primitives for IoT-Based Mobile Payments," in IEEE Systems Journal, vol. 12, No. 2, pp. 2027-2038, Jun. 2018, doi: 10.1109/JSYST.2017.2668389 (Year: 2017).*

K. C. Kumar, D. Srikanth, P. V. Vardhan, M. Vivek and T. S. Kiran, ""QR Code-Based Vending Machine Using FSM,"" 2023 2nd International Conference on Edge Computing and Applications (ICECAA), Namakkal, India, 2023, pp. 372-376, doi: 10.1109/ICECAA58104.2023.10212241 (Year: 2023).*

F. Zhang, A. Kondoro and S. Muftic, "Location-Based Authentication and Authorization Using Smart Phones," 2012 IEEE 11th International Conference on Trust, Security and Privacy in Computing and Communications, Liverpool, UK, 2012, pp. 1285-1292, doi: 10.1109/TrustCom.2012.198 (Year: 2012).*

* cited by examiner

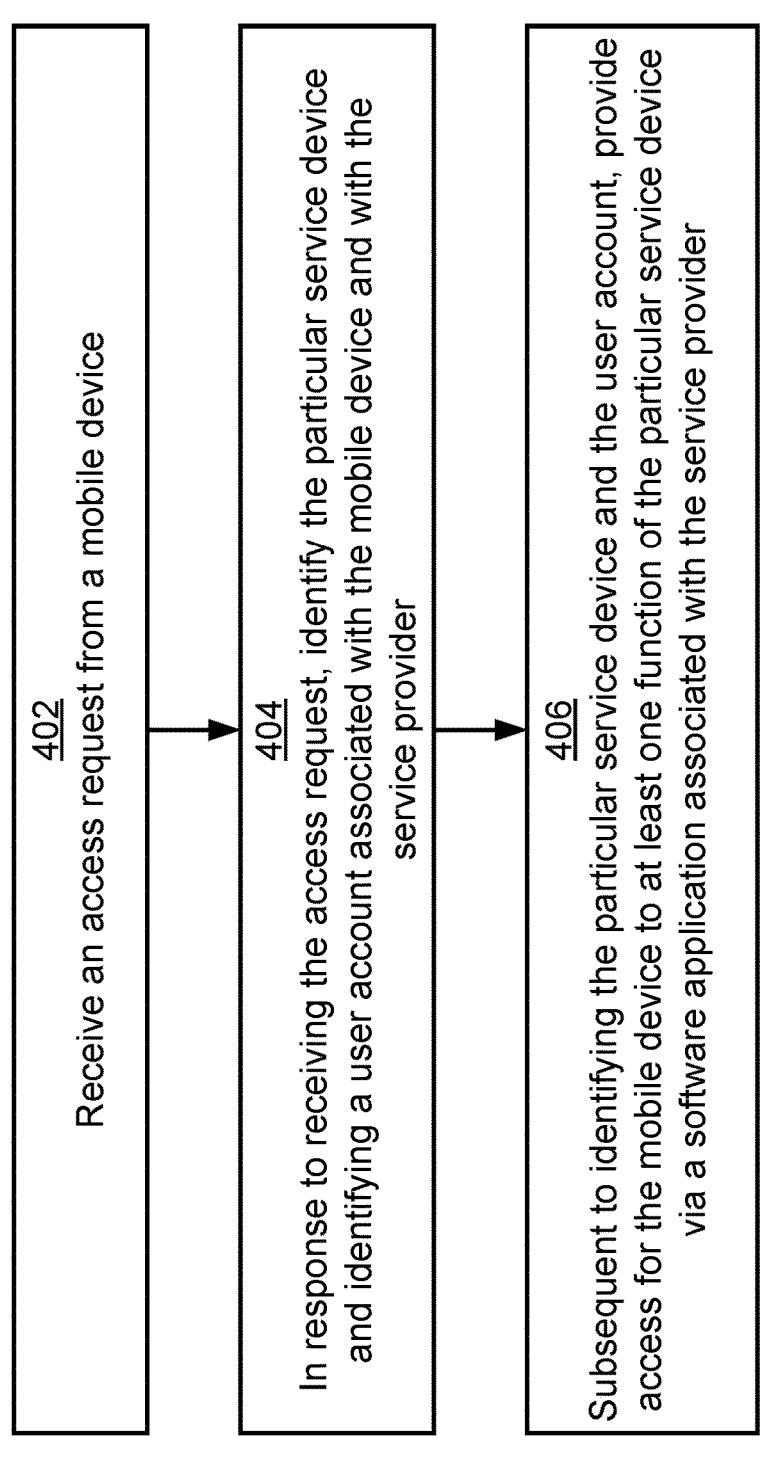

400

402

Receive an access request from a mobile device

404

In response to receiving the access request, identify the particular service device and identifying a user account associated with the mobile device and with the service provider

406

Subsequent to identifying the particular service device and the user account, provide access for the mobile device to at least one function of the particular service device via a software application associated with the service provider

FIG. 4

CONTACTLESS ACCESS TO SERVICE DEVICES TO FACILITATE SECURE TRANSACTIONS

TECHNICAL FIELD

The present disclosure relates generally to secure transactions and, more particularly (although not necessarily exclusively), to providing contactless access service devices to facilitate secure transactions between the service devices and user accounts.

BACKGROUND

A service provider can resolve service events for users at a location associated with the service provider. For example, a user can wait in a queue at the location to have a service event resolved by authorized personnel. However, waiting in the queue can be time-consuming. Thus, it can be desirable to automate the service events, such as by implementing service devices at the location associated with the service provider. The users can interact with the service devices, such as automated teller machines (ATMs), to cause the service devices to perform functions (e.g., the service events). For example, the users can interact with the ATMs to cause the ATMs to withdraw funds, deposit funds, or perform other suitable service events.

Additionally, there can be security concerns with automating the service events. Current service devices can require that users input pin numbers or access cards to authenticate with the service device prior to the user requesting that the service device perform service events. The pin numbers and access cards, however, may be stolen and may not be sufficient for authenticating the user. Therefore, there can be a need for improved security mechanisms for service devices.

SUMMARY

Contactless access to service devices can be provided to facilitate secure transactions between the service devices and user accounts. For example, a system described herein can include a plurality of Internet of Things (IoT) service devices associated with a service provider. The system can also include a computing environment, which can be configured to control the plurality of IoT service devices by receiving an access request from a mobile device. The access request can be transmitted in response to a user of the mobile device performing a contactless authentication process with a particular IoT service device of the plurality of IoT service devices. In response to receiving the access request, the computing environment can identify the particular IoT service device and identify a user account associated with the mobile device and with the service provider. Subsequent to identifying the particular IoT service device and the user account, the computing environment can provide access for the mobile device to at least one function of the particular IoT service device via a software application associated with the service provider. The at least one function can be used to facilitate a secure transaction between the particular IoT service device and the user account.

In another example, a computer-implemented method described herein can include receiving an access request from a mobile device. The access request can be transmitted in response to a user of the mobile device performing a contactless authentication process with a particular IoT service device of a plurality of IoT service devices. The plurality of IoT service devices can be associated with a service provider. In response to receiving the access request, the computer-implemented method can include identifying the particular IoT service device and identifying a user account associated with the mobile device and with the service provider. Subsequent to identifying the particular IoT service device and the user account, the computer-implemented method can include providing access for the mobile device to at least one function of the particular IoT service device via a software application associated with the service provider. The at least one function can be used to facilitate a secure transaction between the particular IoT service device and the user account.

In an example, a non-transitory computer-readable medium can include instructions that are executable by a processor for causing the processor to perform operations including receiving an access request from a mobile device. The access request can be transmitted in response to a user of the mobile device performing a contactless authentication process with a particular IoT service device of a plurality of IoT service devices. The plurality of IoT service devices can be associated with a service provider. In response to receiving the access request, the operations can include identifying the particular IoT service device and identifying a user account associated with the mobile device and with the service provider. The operations can further include, subsequent to identifying the particular IoT service device and the user account, providing access for the mobile device to at least one function of the particular IoT service device via a software application associated with the service provider. The at least one function can be used to facilitate a secure transaction between the particular IoT service device and the user account.

BRIEF DESCRIPTION OF THE DRAWINGS

FIG. 4 is a flowchart of a process for facilitating secure transactions between IoT service devices and user accounts according to one example of the present disclosure.

DETAILED DESCRIPTION

Figure 1:
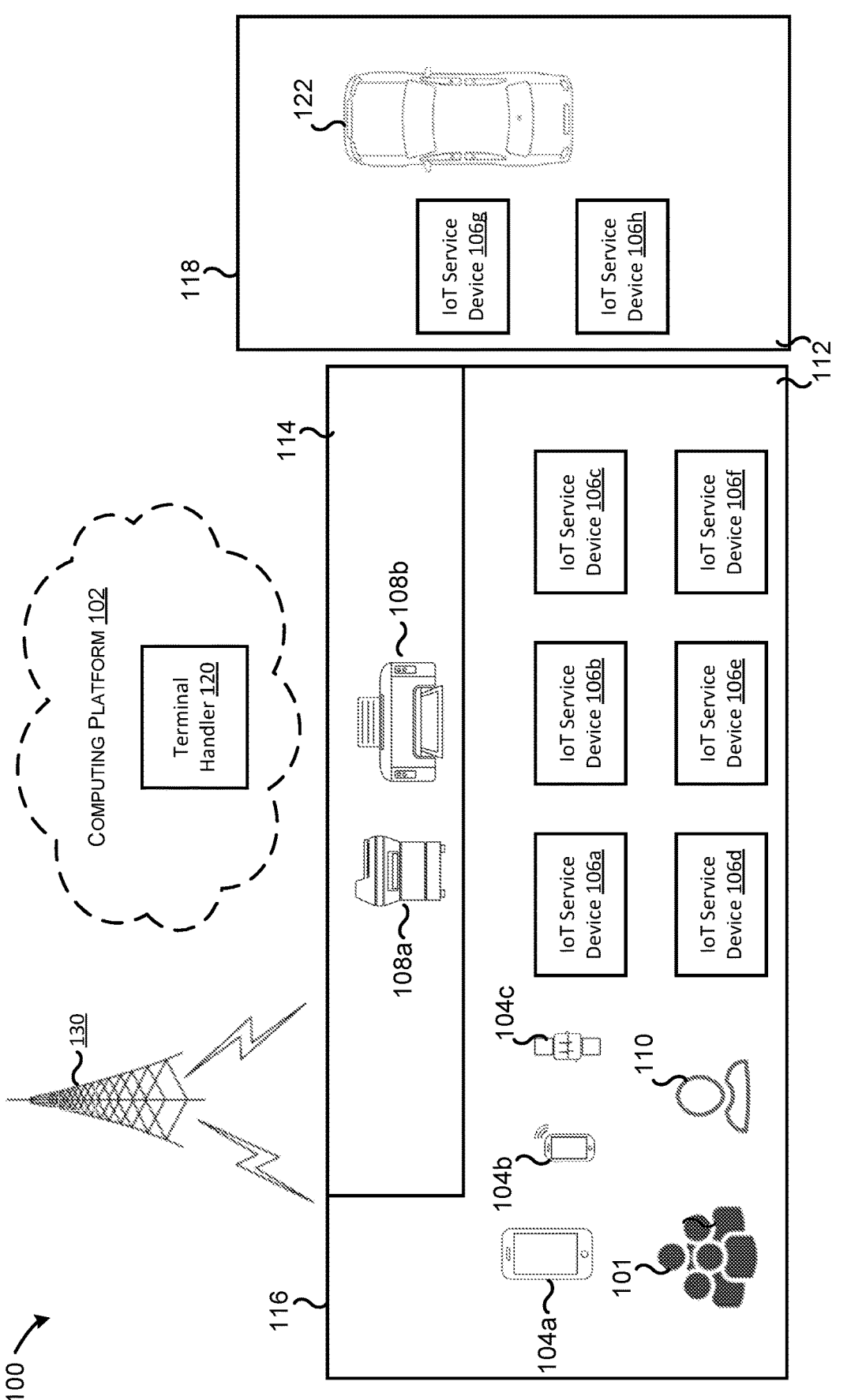
FIG. 1 is a schematic of an example of an Internet of Things (IoT) service device environment according to one example of the present disclosure.

Certain aspects and examples of the present disclosure relate to providing contactless access to service devices to facilitate secure transactions between the service devices and user accounts. In some examples, the service devices can be Internet of Things (IoT) service devices. Examples of service devices can include automated teller machines (ATMs), electronic funds transfer (EFT) terminals, teller cash recyclers (TCRs), check scanners, printers, or other suitable devices associated with a service provider (e.g., a financial institution). The IoT service devices can be service devices that are connected to a network, such as a local area network (LAN) or the internet. The IoT service devices can be in communication with a computing environment (e.g., an IoT computing platform), mobile devices, other service devices, other IoT devices, etc. via the network. For example, the IoT service devices can receive requests to perform functions, receive requests for data, transmit data, or otherwise communicate with the IoT computing platform, the mobile devices, the other service devices, the other IoT devices, etc. via the network.

In some examples, the IoT service devices can be situated within a location associated with the service provider (e.g., a branch of the financial institution) and the contactless access can be provided to mobile devices. In particular, the contactless access may be provided to mobile devices associated with the service provider. For example, the mobile devices can be authorized mobile devices, such as those belonging to employees or other suitable authorized personnel for the service provider. Additionally, the mobile devices can be registered with user accounts associated with the service provider or can be running a software application associated with the service provider.

To provide the contactless access to the IoT service devices for the mobile devices, a contactless authentication process can be performed. The contactless authentication process can result in a mobile device transmitting an access request to the computing environment. In one example, the contactless authentication process can involve a user of the mobile device scanning, via the mobile device, a Quick Response (QR) code associated with an IoT service device. The user scanning the QR code can cause the mobile device to automatically transmit the access request. In another example, the user may perform a tap gesture with the mobile device to a near-field communication (NFC) token associated with the IoT service device. The tap gesture can enable communication to be established between the IoT service device, the computing environment, and the mobile device. The mobile device may then automatically transmit the access request due to the established communication with the computing environment and the IoT service.

In response to receiving the access request, the computing environment may identify the IoT device for which access is being requested. For example, the location associated with the service provider may include various IoT service devices, and each service device may include a unique QR code. The computing device may access a first database with a first mapping that relates each QR code to a corresponding IoT service device. Thus, the computing environment may identify which IoT service device is related to the access request based on the first mapping or by otherwise determining which IoT service device is associated with the scanned QR code. Similarly, in some examples, each NFC token for each IoT service device may include a unique code. Thus, the computing environment may identify the IoT service device based on a unique code of the NFC token used to establish communication with the mobile device. The computing environment may also identify a user account associated with the mobile device. For example, a second database may include a second mapping relating mobile devices registered with user accounts to the user accounts. Thus, the computing environment may identify a user account associated with the mobile device based on the second mapping or by otherwise determining which user account is associated with the mobile device. Additionally, by identifying the user account based on the mobile device being registered with the user account or by otherwise being associated with the user account, the computing environment can verify that the mobile device is authorized to access the IoT service.

After the computing environment identifies the IoT device and the user account, the computing environment can provide access for the mobile device to functions of the IoT service device via the software application associated with the service provider. In this way, contactless access to the IoT service device is provided for the mobile device via the software application. For example, the computing environment can transmit a push notification to the mobile device, which can be selected by the user to open the software application. The software application can be linked to the user account and can provide options corresponding to functions of the IoT service device.

Accordingly, via the contactless access, the mobile device can transmit requests for the IoT service device to perform one or more functions. For example, the mobile device may transmit a request as a result of the user selecting one of the options corresponding to one of the functions. The request can be for the IoT service device to perform the function as indicated by the selected option with respect to the user account. For example, the IoT service device can be an ATM and functions that can be performed via the ATM can include depositing funds, withdrawing funds, transferring funds, etc. Thus, the request can be for the ATM to transfer a certain amount of funds from the user account to a secondary account. For example, the user account can be a checking account belonging to the user and the secondary account may be a savings account belonging to the user. In response to receiving the request from the mobile device, the computing environment may cause the IoT service device to perform the function by, for example, transmitting an application programming interface (API) call to the IoT service device. In this way, the computing environment can facilitate a secure transaction between the user account and the IoT service device, in which the IoT service device transfers funds from the user account in a secure manner. In other examples, the secure transaction facilitated can include an IoT service device transmitting data to or from the user account, withdrawing funds from the user account, depositing funds to the user account, etc.

Current systems can involve the user directly interacting with the service device. For example, the service device can include a user interface with options for the functions. The user can select, via the user interface, an option to cause the service device to perform a function. Additionally, there can be security concerns with the current systems. For example, in the current systems, a pin number, an access card, or a combination thereof can be used to authenticate with the service device. The user may input the pin number or the access card, both of which may be associated with the user account, via the user interface. The service device can authenticate the user based on the pin number or the access card, and can, for example, withdraw funds from the user account. However, if for example, the pin number or the access card, are stolen, the service device may not be able to detect a security breach and may still perform the withdrawal of funds. Additionally, due to the security concerns with current systems, the functions that the service devices can perform may be limited. For example, the user may only be able to withdraw funds up to a withdraw limit (e.g., up to $500) via the service device.

Examples of the present disclosure can overcome one or more of the above-mentioned problems via a computing environment that can provide contactless access for mobile devices to IoT service devices. By providing the contactless access, the computing environment can transfer control of an IoT service device from the IoT service device itself to a mobile device. As a result of the transfer of control, improved security measures can be implemented. For example, an access request may be transmitted by a mobile device in response to a user performing a contactless authentication process via the mobile device. The user may have authentication credentials (e.g., the pin number) for authenticating with the IoT service device. But, if, for example, the computing environment is unable to identify a user account based on the mobile device used to perform the contactless authentication process, the computing environment may detect a possible security breach. As a result, the computing environment may not provide access for the mobile device to the functions of the IoT service device. Additionally, due to transfer of control, the IoT service devices may not require screens or other suitable mechanisms for user interaction. As a result, interaction with the IoT service devices may only be possible via authenticated, registered, or otherwise verified mobile devices.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of an example of an IoT service device environment 100 according to one example of the present disclosure. The IoT service device environment 100 can be a location associated with a service provider. For example, the service provider can be a financial institution and the IoT service device environment 100 can be a branch location associated with the financial institution. The IoT service device environment 100 may include an indoor area 116 and an outdoor area 118. The IoT service device environment 100 may further include user accessible areas 112 and user inaccessible areas 114. The user accessible areas 112 can be accessed by one or more users 101, authorized personnel 110, etc. Additionally, devices 104a-c and IoT service devices 106a-h can be located within the user accessible areas 112. The user inaccessible areas 114 can also be accessed by authorized personnel 110, but may not be accessed by users 101. In some examples, auxiliary devices 108a-b may be located in the user inaccessible areas 114 for use by the authorized personnel 110.

The devices 104a-c can include mobile device such as tablets 104a, smartphones 104b, smart watches 104c, or the like. The devices 104a-c can be associated with the user 101 such as by being registered with a user account belonging to the user 101. The devices 104a-c may also be associated with the authorized personnel 110, such as by being accessible via authorization credentials provided by the authorized personnel 110. The IoT service devices 106a-h can be device for performing service events. The service events can be secure transactions performed with respect to a user account, such as a withdrawal of funds from the user account, an update to data associated with the user account, etc. Thus, the IoT service devices 106a-h can include automated teller machines (ATMs), electronic funds transfer (EFT) terminals, teller cash recyclers (TCRs), check scanners, or other suitable devices associated with a service provider (e.g., a financial institution) and capable of performing service events. Additionally, the auxiliary devices 108a-b can include printers 108b, copiers 108a, or other suitable devices.

The IoT service device environment 100 may also include a computing platform 102. Examples of the computing platform 102 include a cloud computing platform or an Internet of Things (IoT) computing platform. The devices 104a-c, the IoT service devices 106a-h, and the computing platform 102 can be communicatively coupled via a network 130. The network 130 may correspond to a Wide Area Networks ("WANs"), such as the Internet. In other examples, the network 130 may be a mobile telecommunication network, a short-range wireless network, or the like. The devices 104a-d and the IoT service devices 106a-h may also communicate with servers, web browsers, or user-side applications via the network 130 to establish communication sessions, request and receive web-based resources, or access other suitable features of software applications or web services.

Additionally, in some examples, a terminal handler 120 can be operating on the computing platform 102 for communicating with devices 104a-c, controlling IoT service devices 106a-h, or a combination thereof. The terminal handler 120 can manage each of the IoT service devices 106a-h. In some examples, the terminal handler 120 may also manage the auxiliary devices 108a-b. The terminal handler 120 can receive requests from the devices 104a-c. The requests can be for a IoT service device to perform functions. For example, the IoT device may be an ATM and a request can be for the IoT service device to deposit a certain amount of funds into a user account. The terminal handler 120 may grant or deny requests based on an authentication process. Additionally, in some examples, the terminal handler 120 may initiate a step-up authentication protocol in response to the request. The step-up authentication protocol can include the terminal handler 120 transmitting a request for a user to perform an additional or more secure authentication process. In some examples, the terminal handler may also detect an issue with an IoT service device and may further notify the authorized personnel 110, technician specialists, or the like of the issue.

Although certain examples described herein relate to the use of mobile devices to access the IoT service device 106a-h, in other examples, the devices 104a-c may additionally or alternatively include non-mobile devices (e.g., desktop computers, laptop computers, and the like). The non-mobile devices can also be capable of communicating with or accessing any of the IoT service devices 106a-h via the network 130.

Additionally, although eight IoT service devices are depicted in FIG. 1, any number of IoT service devices can be found in the IoT service device environment 100. Moreover, as illustrated in FIG. 1, a first subset of the IoT service devices 106a-f can be indoor IoT service devices located in the indoor area 116 and a second subset of the IoT service devices 106g-h can be outdoor IoT service devices located in the outdoor area 118. In some examples, the outdoor IoT service devices (106g and 106h) can be accessible to a user within a user vehicle 122.

Figure 2:
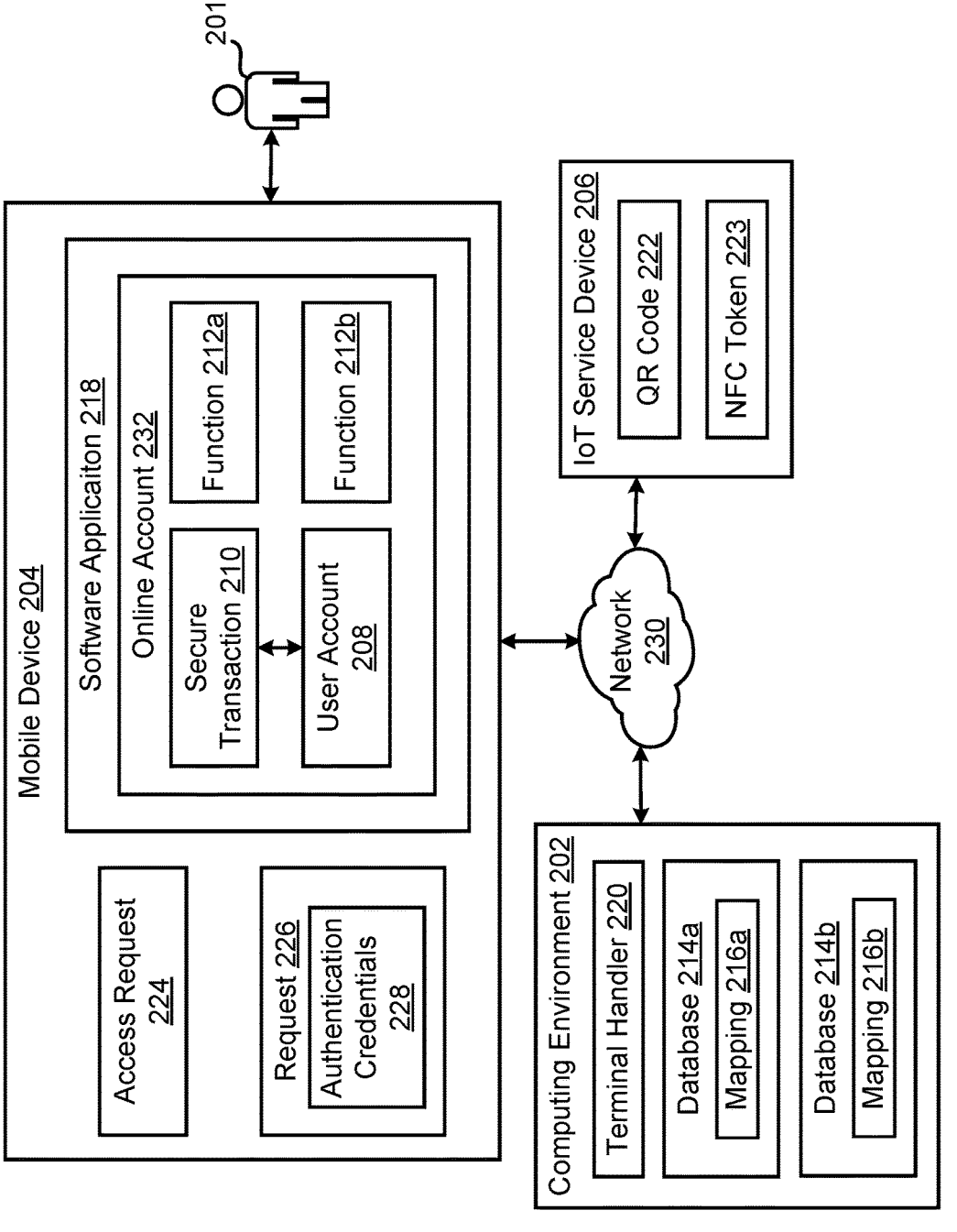
FIG. 2 is a block diagram of an example of a system for facilitating secure transactions between IoT service devices and user accounts according to one example of the present disclosure.

FIG. 2 is a block diagram of an example of a system 200 for facilitating secure transactions between service devices and user accounts according to one example of the present disclosure. The system 200 includes a computing environment 202. In some examples, the computing environment 202 may be a distributed computing environment, such as a cloud computing system, an IoT computing platform, or a computing cluster, formed from one or more nodes (e.g., physical or virtual servers) that are in communication with one another via a network 230. Additionally, in some examples, the computing environment 202 can correspond to the computing platform 102 of FIG. 1. The computing environment 202 can be in communication with a mobile device 204 and an IoT service device 206 via the network 230. Examples of the network 230 can include a local area network (LAN) or the Internet. The computing environment 202 can be formed from a physical infrastructure that includes various network hardware, such as routers, hubs, bridges, switches, and firewalls. The physical infrastructure can also include one or more servers. The servers may provide backend support for a software application 218 (e.g., a mobile application) or may provide a web interface for enabling a user 201 to interact with the IoT service device 206, a user account 208, or a combination thereof.

In an example, the user 201 may establish the user account 208 with a service provider. The user account 208 may be of any suitable type of account. For example, the service provider may be a bank and the user account 208 may be a deposit account. Separately from establishing the user account 208, the user 201 may register for an online account 232 with the service provider for use in monitoring and performing functions related to the underlying user account 208. The user 201 may then link the online account to the underlying user account 208 hosted by the service provider. The user 201 can also register the online account 232 with the mobile device 204. Examples of the mobile device can include a mobile phone, a laptop, a tablet, or a smart watch. Additionally, the online account 232 can be in communication with the IoT service device 206 such that the online account 232 can be used to access and control the IoT service device 206.

As a result of registering the online account 232 with the mobile device 204, the user 201 may obtain access to the online account 232 via the software application 218 executing on mobile device 204. For example, the user 201 may access the online account 232 via the mobile application or the web interface. In doing so, due to the online account 232 being in communication with the IoT service device 206, the user 201 can obtain access to functions 212a-b of the IoT service device 206.

For example, to obtain access to the functions 212a-b the mobile device 204 may transmit an access request 224 to the computing environment 202. The mobile device 204 may transmit the access request 224 in response to the user 201 performing a contactless authentication process with the IoT service device 206. For example, the IoT service device 206 can be positioned within a location (e.g., IoT service device environment 100). The location of the IoT service device 206 may be a secure location controlled by or otherwise associated with the service provider. Additionally, the IoT service device 206 may be one of many IoT service devices within the location. For example, the IoT service device 206 may be an automated teller machine (ATM), and the location may also include one or more additional ATMs, electronic funds transfer (EFT) terminals, teller cash recyclers (TCRs), check scanners, printers, or other suitable types of IoT service devices associated with service provider. Each of the IoT service devices can be associated with a unique Quick Response (QR) code. For example, QR code 222 can be associated with IoT service device 206. Therefore, the user 201 may perform the contactless authentication process by scanning the QR code 222 for the IoT service device 206.

Additionally or alternatively, the IoT service devices may include near field communication (NFC) tokens. Therefore, in some examples, the user 201 may perform the contactless authentication process by performing a tap gesture with respect to the NCF token. For example, the user 201 may perform the tap gesture by placing the mobile device 204 or a card close (e.g., within four inches) to the NFC token. In response to the tap gesture, communication between the mobile device 204 and the IoT service device 206 can be established. The mobile device 204 can then transmit the access request 225 via the communication with the NFC token.

In response to receiving the access request 224 from the mobile device 204, the computing environment 202 may identify the IoT service device 206. For example, due to the location associated with service provider including multiple IoT service devices, the computing environment 202 may be required to identify which IoT service device 206 the mobile device 204 is requesting access too. In an example, the computing environment may identify the IoT service device 206 by accessing a first database 214a with a first mapping 216a that relates each of the IoT service devices for the location or associated with the service provider to a corresponding QR code. Thus, the computing environment 202 can determine that the access request 224 from the mobile device 204 is for IoT service device 206 based the first mapping 216a associating the QR code 222 with the IoT service device 206.

Additionally, in response to receiving the access request 224 from the mobile device 204, the computing environment 202 may further identify a user account 208 associated with the mobile device 204 and with the service provider. For example, the user 201 may register the mobile device 204 with the user account 208, the online account 232, or a combination thereof. A second database 214b can include a second mapping 216b that relates mobile devices to corresponding user accounts based on the mobile devices being registered. Thus, the computing environment 202 may identify the user account 208 by accessing the second database 214 and determining, based on the second mapping 216b, that the user account 208 is associated with the mobile device 204.

Subsequent to identifying the IoT service device 206 and the user account 208, the computing environment 202 can provide access for the mobile device 204 to functions 212a-b of the IoT service device 206 via the software application 218 associated with the service provider. Therefore, the contactless authentication process can result in a digital handshake between the mobile device 204 and the IoT service device 206. Due to the digital handshake (i.e., the access provided for the mobile device 204 to the functions 212a-b via the software application) the functions 212a-b can be used facilitate one or more secure transactions between the IoT service device 206 and the user account 208.

For example, after providing the access for the mobile device 204 to the functions 212a-b, the computing environment 202 may receive a request 226 for the IoT service device 206 to perform one or more of the functions 212a-b. For example, the request 226 can be for the IoT service device 206 to perform a first function 212a. In a particular example, the IoT service device 206 can be an ATM that is in communication with the computing environment 202 via the network 230 and the first function 212a can be for withdrawing funds from the user account 208. The request 226 can include an amount of funds to be withdrawn. The request 226 can also include the authentication credentials 228, which may be associated with the online account 232, the user account 208, the IoT service device 206, or a combination thereof.

In response to receiving the request 226, the computing environment 202 can authenticate the mobile device 204. The computing environment 202 may authenticate the user 201 of the mobile device 204. To authenticate the user 201, the computing environment 202 may verify that an authentication process was successful. For example, upon or prior to selecting one of the functions 212a-b via the software application 218, the user 201 may be prompted to provide the authentication credentials 228. The authentication credentials 228 can then be included in the request 226. Thus, verifying that the authentication process was successful may include the computing environment 202 verifying that the authentication credentials 228 (e.g., a username and password) are valid for authenticating with the online account 232, the user account 208, the IoT service device 206, or a combination thereof.

Additionally, to authenticate the mobile device 204, the computing environment 202 can determine that the mobile device 204 is proximate to the IoT service device 206. For example, the computing environment 202 may detect a location of the mobile device 204, such as by accessing location services of the mobile device 204. Then, the computing environment 202 may determine a distance between the location of the mobile device 204 and a location of the IoT service device 206. The computing environment 202 may further determine that the distance is less than a threshold distance to authenticate the mobile device 204.

Moreover, in some examples, the computing environment 202 may detect that the mobile device 204 performed the contactless authentication process (e.g., scanned the QR code 222 or tapped the NFC token 223) to determine that the mobile device 204 is proximate to the IoT service device 206. Additionally, in some examples, the computing environment 202 may authenticate the mobile device 204 by verifying that the mobile device 204 is a registered device for the online account 232 and/or the user account 208. For example, the computing environment 202 can access the second database 214b to verify that the request 226 was received from the registered mobile device for the user account 208.

After authenticating the user 201 and the mobile device 204, the computing environment 202 can transmit an application programming interface (API) call or otherwise communicate with the IoT service device 206 to cause the IoT service device to perform the first function 212a. In the example, the API used by the computing environment 202 can be an extension for financial services (XFS). In particular, the API can be XFS4. Therefore, the computing environment can communicate with and cause the IoT service device 206 to perform the first function 220a by transmitting the API call via the API (e.g., the XFS4). In this way, the computing environment 202 can automatically cause the IoT service device 206 to perform the first function 212a in response to the request 226. Additionally, by performing the first function 212a the IoT service device can cause a secure transaction 210 between the IoT service device 206 and the user account 208, such as a withdrawal of the amount of funds from the user account 208 as indicated in the request 226.

Additionally or alternatively, the computing environment 202 may receive a second access request from a second mobile device The second mobile device 204b can be an authorized device for the service provider. Thus, the second mobile device can have higher privileges than the mobile device 204. For example, the second mobile device can be used to request that the IoT service device 206 perform the functions 212a-b or may be used to request access to the online account 232, the user account 208, or a combination thereof on behalf of the mobile device 204. Additionally, the second mobile device 204b can be operated by authorized personnel associated with the service provider or the IoT service device 206.

In an example, the computing environment 202 may detect an issue with the access request 224 or the request 226. The issue may include the authentication credentials 228 being invalid, the mobile device 204 not being the registered mobile device for the user account 208, the mobile device 204 not being included in the second database 214b, the computing environment 202 being unable to detect the proximity of the mobile device 204 to the IoT service device 206, etc. In response to detecting the issue, the computing environment 202 may transmit a notification of the issue to the second mobile device.

As a result, the authorized personnel can perform the contactless authentication on behalf of the user 201. For example, the authorized personnel can use the second mobile device to scan the QR code 222 or tap the NFC token 223. The second access request transmitted by the second mobile device may include an indication of the mobile device 204 for which the authorized personnel is requesting access on behalf of. The computing environment 202 can identify the IoT service device 206 based on the contactless authentication process performed via the second mobile device. The computing environment 202 may also identify the user account 208 based on the indication of the mobile device 204. As a result, the computing environment 202 can provide access for the second mobile device to the functions 212a-b of the IoT service device 206 via the software application 218 operating on the second mobile device. The authorized personnel can then use the second mobile device to request that the IoT service device 206 perform the functions 212a-b with respect to the user account 208.

Additionally, in some examples, the computing environment 202 can include a terminal handler 220 for connecting, monitoring, and maintaining the system 200. The terminal handler 220 can manage interactions between the computing environment 202, the IoT service device 206, and the mobile device 204. For example, the terminal handler 220 can permit the mobile device 204 to access the functions 212a-b via the software application 218 in response to the access request 224. The terminal handler 220 may also authenticate the user 201, authenticate the mobile device 204, or transmit the API call in response to the request 226. Additionally, the terminal handler 220 may be able to monitor the IoT service device 206. For example, the terminal handler 220 may monitor cash levels of the ATM.

Figure 3:
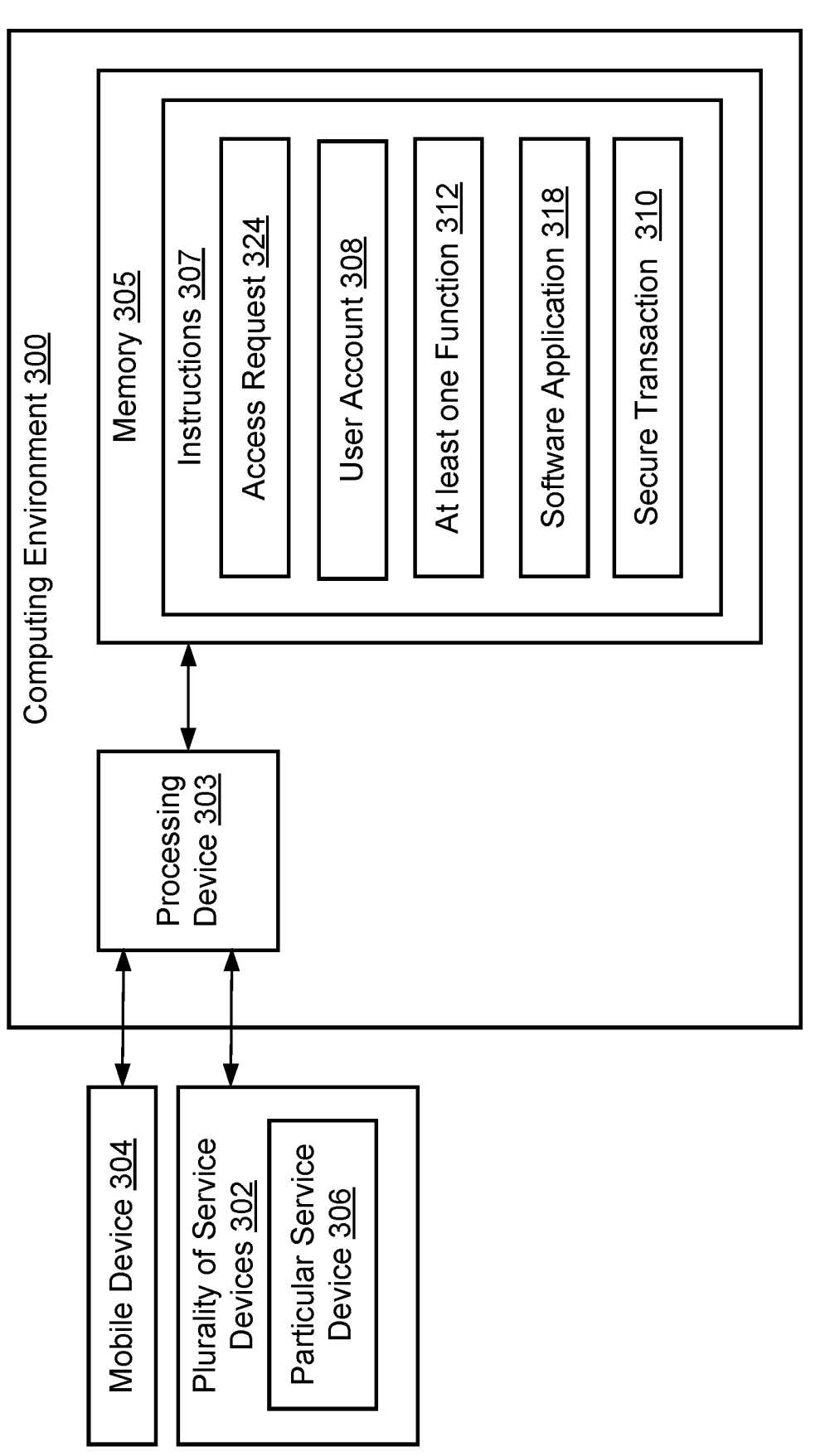
FIG. 3 is a block diagram of an example of a computing environment for facilitating secure transactions between IoT service devices and user accounts according to one example of the present disclosure.

FIG. 3 is a block diagram of an example of a computing environment 300 for facilitating secure transactions between service devices and user accounts according to one example of the present disclosure. The components shown in FIG. 3, such as the processing device 303, the memory 305, and the like, may be integrated into a single structure such as within the single housing of the computing environment 300. Alternatively, the components shown in FIG. 3 can be distributed from one another and in electrical communication with each other.

As shown, the computing environment 300 includes the processing device 303 communicatively coupled to the memory 305. The processing device 303 can include one processor or multiple processors. Non-limiting examples of the processing device 303 include a Field-Programmable Gate Array (FPGA), an application specific integrated circuit (ASIC), a microprocessor, or any combination of these. The processing device 303 can execute instructions 307 stored in the memory 305 to perform operations. In some examples, the instructions 307 can include processor-specific instructions generated by a compiler or an interpreter from code written in any suitable computer-programming language, such as C, C++, C#, Python, or Java.

The memory 305 can include one memory device or multiple memory devices. The memory 305 can be non-volatile and may include any type of memory device that retains stored information when powered off. Non-limiting examples of the memory 305 include electrically erasable and programmable read-only memory (EEPROM), flash memory, or any other type of non-volatile memory. At least some of the memory 305 can include a non-transitory computer-readable medium from which the processing device 303 can read instructions 307. The non-transitory computer-readable medium can include electronic, optical, magnetic, or other storage devices capable of providing the processing device 303 with the instructions 307 or other program code. Non-limiting examples of the non-transitory computer-readable medium include magnetic disk(s), memory chip(s), RAM, an ASIC, or any other medium from which a computer processor can read instructions 307.

The processing device 303 can execute the instructions 307 to perform operations. For example, the processing device 303 can receive an access request 324 from a mobile device 304. The access request 324 can be transmitted by a user of the mobile device 304 performing a contactless authentication process with a particular IoT service device 306 of a plurality IoT service devices 302. The plurality of IoT service devices 302 can be associated with a service provider. In response to receiving the access request 324, the processing device 303 can further identify the particular IoT service device 306 and can identify a user account 308 associated with the mobile device 304 and with the service provider. Subsequent to identifying the particular IoT service device 306 and the user account 308, the processing device 303 can provide access for the mobile device 304 to at least one function 312 of the particular IoT service device 306 via a software application 318 associated with the service provider. The at least one function 312 can be used to facilitate a secure transaction 310 between the particular IoT service device 306 and the user account 308.

FIG. 4 is a flow chart of a process 400 for facilitating secure transactions between service devices and user accounts according to one example of the present disclosure. The process 400 of FIG. 4 can be implemented by the terminal handler 120 of FIG. 1, the computing environment 202 of FIG. 2, or the processing device 303 of FIG. 3, but other implementations are also possible. While FIG. 4 depicts a certain sequence of steps for illustrative purposes, other examples can involve more steps, fewer steps, different steps, or a different order of the steps depicted in FIG. 4. The steps of FIG. 4 are described below with reference to the components of FIGS. 1-3 described above.

At block 402, the processing device 303 can receive an access request 224 from a mobile device 204. The access request 224 can be transmitted in response to a user 201 of the mobile device 204 performing a contactless authentication process with a particular IoT service device 306 of a plurality IoT service devices 302. For example, the particular IoT service device 306 can correspond to the IoT service device 206 of FIG. 2. The IoT service device 306 can be positioned in a location associated with a service provider, such as the IoT service device environment 100 depicted in FIG. 1. Additionally, each IoT service device of the plurality of IoT service devices 302 can be associated with a unique QR code. Thus, the contactless authentication process may be performed by the user 201 scanning, with the mobile device 204, a QR code 222 associated with the IoT service device 306.

At block 404, the processing device 303 can, in response to receiving the access request 224, identify the particular service device 306 and identify a user account 208 associated with the mobile device 204 and with the service provider. In some examples, the processing device 303 may access a first database 214a that includes a first mapping 216a. The first mapping 216a can relate each IoT service device of the plurality of IoT service devices 306 to a corresponding QR code. Therefore, the processing device 303 may identify the IoT service device 306 by accessing the first database 214a and determining, based on the first mapping 216a, the IoT service device 306 is associated with the scanned QR code 222.

Additionally or alternatively, the processing device 303 may access a second database 214b that includes a second mapping 216b. The second mapping 216b can relate mobile devices registered with or otherwise associated with the service provider with a corresponding user account. Therefore, the processing device 303 may identify the user account 208 by accessing the second database 214b and determining, based on the second mapping 216b, that the user account 208 is associated with the mobile device 204 that transmitted the access request 224.

At block 406, the processing device 303 can, subsequent to identifying the particular service device 306 and the user account 208, provide access for the mobile device 204 to at least one function 312 of the particular service device 306 via a software application 218 associated with the service provider. The at least one function 312 can correspond to the functions 212a-b of FIG. 2. Additionally, the at least one function 312 can be used to facilitate a secure transaction 210 between the IoT service device 306 and the user account 208.

For example, the processing device 303 may receive, from the mobile device 204, a request 226 for the IoT service device 306 to perform the at least one function 312. The processing device 303 may receive the request 226 as a result of the user 201 selecting, via the software application 218 on the mobile device 204, a first function 212a. The user 201 may also provide additional information associated with the first function 212a via software application 218. For example, the first function 212b may be associated with withdrawing funds and the additional information provided by the user 201 may include an amount of funds to be withdrawn. Thus, the request 226 can include an indication of the first function 212a and the additional information. The request may also include authentication credentials 228 associated with the user account 208.

The processing device 303 may then authenticate the request 226. To authenticate the request 226 the processing device may authenticate the user 201 based on the authentication credentials 228, may authenticate the mobile device 204 based on a distance between a location of the mobile device 204 and a location of the IoT service device 306 being less than a threshold distance, or a combination thereof. After authenticating the request 226, the processing device 303 may transmit an application programming interface (API) call to the IoT service device 306 to cause the IoT service device 306 to perform the first function 212a. In this way, the processing device 303 can facilitate the secure transaction between the IoT service device 306 and the user account 208 (e.g., the withdrawal of funds from the user account by the IoT service device).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a plurality of Internet of Things (IoT) service devices associated with a service provider;

a computing environment, the computing environment configured to control the plurality of IoT service devices by:

receiving a first access request from a first mobile device, the first access request transmitted in response to a first user of the first mobile device performing a contactless authentication process with a particular IoT service device of the plurality of IoT service devices;

in response to receiving the first access request, authenticating the first mobile device by:

accessing location services of the first mobile device to determine a location of the first mobile device; and determining that a distance between the location of the first mobile device and a location of the particular IoT service device is less than a threshold distance;

in response to authenticating the first mobile device:

identifying a user account associated with the first mobile device and with the service provider;

providing access for the first mobile device to a first selectable option corresponding to a function of the particular IoT service device, the first selectable option being provided via a software application associated with the service provider, and the function involving a secure transaction with respect to the user account;

receiving, from the first mobile device and in response to a user selection of the first selectable option, a first request for the particular IoT service device to execute the function, the first request comprising first authentication credentials associated with the first user;

determining, based on the first authentication credentials that the first request is invalid; and in response to determining that the first request is invalid:

transmitting a notification indicating that the first request is invalid to a second mobile device, the second mobile device being an authorized device associated with the service provider;

receiving, from the second mobile device, a second access request in response to a second user of the second mobile device performing the contactless authentication process with the particular IoT service device of the plurality of IoT service devices;

in response to receiving the second access request, authenticating the second mobile device based on the second mobile device being the authorized device associated with the service provider;

in response to authenticating the second mobile device, providing access, for the second mobile device, to a second selectable option corresponding to the function of the particular IoT service device;

receiving, from the second mobile device and in response to a user selection of the second selectable option, a second request for the particular IoT service device to execute the function involving the secure transaction with respect to the user account, the second request including second authentication credentials for authorized personnel associated with the service provider;

in response to receiving the second request, authenticating the second user of the second mobile device based on the second authentication credentials; and in response to receiving the second request to perform the function involving the secure transaction with respect to the user account and to authenticating the second mobile device and the second user, transmitting an application programming interface call to the particular IoT service device to cause the particular IoT service device to execute the function by executing the secure transaction with respect to the user account.

2. The system of claim 1, wherein the computing environment receives the first access request from the first mobile device in response to the first user performing the contactless authentication process by scanning a QR code associated with the particular IoT service device.

3. The system of claim 2, wherein the computing environment is further configured to control the plurality of IoT service devices by identifying the particular IoT service device by:

accessing a database, the database comprising a mapping that relates each IoT service device of the plurality of IoT service devices to a corresponding QR code of a plurality of QR codes; and determining, based on the mapping, that the QR code is associated with the particular IoT service device.

4. The system of claim 1, wherein the computing environment receives the first access request from the first mobile device in response to the first user performing the contactless authentication process via a tap gesture of the first mobile device to a NFC token associated with the particular IoT service device.

5. The system of claim 1, wherein the computing environment identifies the user account associated with the first mobile device and with the service provider by:

accessing a database, the database comprising a mapping that relates each mobile device of a plurality of mobile devices to a corresponding user account of a plurality of user accounts; and determining, based on the mapping, that the first mobile device is associated with the user account.

6. A computer-implemented method comprising:

receiving a first access request from a first mobile device, the first access request transmitted in response to a first user of the first mobile device performing a contactless authentication process with a particular Internet of Things (IoT) service device of a plurality of IoT service devices, the plurality of IoT service devices associated with a service provider;

in response to receiving the first access request, authenticating the first mobile device by:

accessing location services of the first mobile device to determine a location of the first mobile device;

determining that a distance between the location of the first mobile device and a location of the particular IoT service device is less than a threshold distance;

in response to authenticating the first mobile device:

identifying a user account associated with the first mobile device and with the service provider;

providing access for the first mobile device to a first selectable option corresponding to a function of the particular IoT service device, the first selectable option being provided via a software application associated with the service provider, and the function involving a secure transaction with respect to the user account;

receiving, from the first mobile device and in response to a user selection of the first selectable option, a first request for the particular IoT service device to execute the function, the first request comprising first authentication credentials associated with the first user;

determining, based on the first authentication credentials, that the first request is invalid;

in response to determining that the first request is invalid:

transmitting a notification indicating that the first request is invalid to a second mobile device, the second mobile device being an authorized device associated with the service provider;

receiving, from the second mobile device, a second access request in response to a second user of the second mobile device performing the contactless authentication process with the particular IoT service device of the plurality of IoT service devices;

in response to receiving the second access request, authenticating the second mobile device based on the second mobile device being the authorized device associated with the service provider;

in response to authenticating the second mobile device, providing access, for the second mobile device, to a second selectable option corresponding to the function of the particular IoT service device;

receiving, from the second mobile device and in response to a user selection of the second selectable option, a second request for the particular IoT service device to execute the function involving the secure transaction with respect to the user account, the second request including second authentication credentials for authorized personnel associated with the service provider;

in response to receiving the second request, authenticating the second user of the second mobile device based on the second authentication credentials; and in response to receiving the second request to perform the function involving the secure transaction with respect to the user account and to authenticating the second mobile device and the second user, transmitting an application programming interface call to the particular IoT service device to cause the particular IoT service device to execute the function by executing the secure transaction with respect to the user account.

7. The computer-implemented method of claim 6, wherein each IoT service device of the plurality of IoT service devices comprises a Quick Response (QR) code of a plurality of QR codes, wherein each QR code of the plurality of QR codes is unique, and wherein the first user performs the contactless authentication process by scanning a particular QR code of the plurality of QR codes for the particular IoT service device.

8. The computer-implemented method of claim 7, further comprising identifying the particular IoT service device by:

accessing a database, the database comprising a mapping that relates each IoT service device of the plurality of IoT service devices to a corresponding QR code of the plurality of QR codes; and determining, based on the mapping, that the particular QR code is associated with the particular IoT service device.

9. The computer-implemented method of claim 6, wherein each IoT service device of the plurality of IoT service devices comprises a Near Field Communication (NFC) token of a plurality of NFC tokens, and wherein the first user performs the contactless authentication process via a tap gesture of the first mobile device to a particular NFC token of the plurality of NFC tokens for the particular IoT service device.

10. The computer-implemented method of claim 6, wherein identifying the user account associated with the first mobile device and the service provider comprises:

accessing a database, the database comprising a mapping that relates each mobile device of a plurality of mobile devices to a corresponding user account of a plurality of user accounts; and determining, based on the mapping, that the first mobile device is associated with the user account.

11. A non-transitory computer-readable medium comprising instructions that are executable by a processing device for causing the processing device to perform operations comprising:

receiving a first access request from a first mobile device, the first access request transmitted in response to a first user of the first mobile device performing a contactless authentication process with a particular Internet of Things (IoT) service device of a plurality of IoT service devices, the plurality of IoT service devices associated with a service provider;

in response to receiving the first access request, authenticating the first mobile device by:

accessing location services of the first mobile device to determine a location of the first mobile device;

determining that a distance between the location of the first mobile device and a location of the particular IoT service device is less than a threshold distance;

in response to authenticating the first mobile device:

identifying a user account associated with the first mobile device and with the service provider;

providing access for the first mobile device to a first selectable option corresponding to a function of the particular IoT service device, the first selectable option being provided via a software application associated with the service provider, and the function involving a secure transaction with respect to the user account;

receiving, from the first mobile device and in response to a user selection of the first selectable option, a first request for the particular IoT service device to execute the function, the first request comprising first authentication credentials associated with the first user;

determining, based on the first authentication credentials, that the first request is invalid;

in response to determining that the first request is invalid:

transmitting a notification indicating that the first request is invalid to a second mobile device, the second mobile device being an authorized device associated with the service provider;

receiving, from the second mobile device, a second access request in response to a second user of the second mobile device performing the contactless authentication process with the particular IoT service device of the plurality of IoT service devices;

in response to receiving the second access request, authenticating the second mobile device based on the second mobile device being the authorized device associated with the service provider;

in response to authenticating the second mobile device, providing access, for the second mobile device, to a second selectable option corresponding to the function of the particular IoT service device;

receiving, from the second mobile device and in response to a user selection of the second selectable option, a second request for the particular IoT service device to execute the function involving the secure transaction with respect to the user account, the second request including second authentication credentials for authorized personnel associated with the service provider;

in response to receiving the second request, authenticating the second user of the second mobile device based on the second authentication credentials; and in response to receiving the second request to perform the function involving the secure transaction with respect to the user account and to authenticating the second mobile device and the second user, transmitting an application programming interface call to the particular IoT service device to cause the particular IoT service device to execute the function by executing the secure transaction with respect to the user account.

12. The non-transitory computer-readable medium of claim 11, wherein the operation of receiving the first access request from the first mobile device occurs in response to the first user performing the contactless authentication process by scanning a QR code associated with the particular IoT service device.

13. The non-transitory computer-readable medium of claim 12, wherein the operations further comprise identifying the particular IoT service device by:

accessing a database, the database comprising a mapping that relates each IoT service device of the plurality of IoT service devices to a corresponding QR code of a plurality of QR codes; and determining, based on the mapping, that the QR code is associated with the particular IoT service device.

14. The non-transitory computer-readable medium of claim 11, wherein the operation of receiving the first access request from the first mobile device occurs in response to the first user performing the contactless authentication process via a tap gesture of the first mobile device to a NFC token associated with the particular IoT service device.

15. The non-transitory computer-readable medium of claim 11, wherein the operation of identifying the user account associated with the first mobile device and with the service provider comprises:

accessing a database, the database comprising a mapping that relates each mobile device of a plurality of mobile devices to a corresponding user account of a plurality of user accounts; and determining, based on the mapping, that the first mobile device is associated with the user account.

* * * * *